(12) United States Patent
Castle et al.

(10) Patent No.: US 9,732,177 B2
(45) Date of Patent: Aug. 15, 2017

(54) AMPHIPHILIC COPOLYMERIC MATERIAL

(75) Inventors: Thomas Charles Castle, Chester (GB);
Roger B. Pettman, Marco Island, FL
(US); Terence Cosgrove, Portishead
(GB)

(73) Assignee: REVOLYMER (U.K.) LIMITED,
Deeside (GB)

(*) Notice: Subject to any disclaimer, the term of this
patent is extended or adjusted under 35
U.S.C. 154(b) by 310 days.

(21) Appl. No.: 12/734,318

(22) PCT Filed: Nov. 26, 2008

(86) PCT No.: PCT/EP2008/066257
§ 371 (c)(1),
(2), (4) Date: Apr. 23, 2010

(87) PCT Pub. No.: WO2009/068570
PCT Pub. Date: Jun. 4, 2009

(65) Prior Publication Data
US 2010/0233100 A1    Sep. 16, 2010

(30) Foreign Application Priority Data

Nov. 26, 2007   (EP) .................................... 07121564
Feb. 26, 2008   (EP) ................... PCT/EP2008/052325
(Continued)

(51) Int. Cl.
*C08F 279/02* (2006.01)
*A23G 4/08* (2006.01)
(Continued)

(52) U.S. Cl.
CPC ............. *C08F 279/02* (2013.01); *A23G 4/08* (2013.01); *C08F 255/00* (2013.01);
(Continued)

(58) Field of Classification Search
None
See application file for complete search history.

(56) References Cited

U.S. PATENT DOCUMENTS 3,984,574 A * 10/1976 Comollo ........................... 426/4
4,241,091 A    12/1980 Stroz et al.
(Continued)

FOREIGN PATENT DOCUMENTS

EP    0 284 428 A2   9/1988
EP    0 346 995 A2   12/1989
(Continued)

OTHER PUBLICATIONS

AR Eckert, SE Webber. "Naphthalene-Tagged Copolymer Micelles Based on Polystyrene-alt-Maleic Anhydride-Graft-Poly(Ethylene Oxide)." Macromolecules, 1996, vol. 29, pp. 560-567.*
(Continued)

*Primary Examiner* — Isaac Shomer
(74) *Attorney, Agent, or Firm* — Oliff PLC

(57) ABSTRACT

An amphiphilic polymeric material which has a straight or branched chain polymer backbone and a multiplicity of side chains attached to the backbone, wherein the backbone is a copolymer of at least one ethylenically-unsaturated aliphatic hydrocarbon monomer and maleic anhydride, or is a terpolymer of maleic anhydride, ethylene, and a further ethylenically unsaturated monomer. A method of synthesizing said polymeric material is also provided, together with chewing gum bases, compositions and emulsions comprising amphiphilic polymeric materials.

18 Claims, 3 Drawing Sheets

(30) Foreign Application Priority Data

| | | | |
|---|---|---|---|
| Feb. 26, 2008 | (EP) | ................... | PCT/EP2008/052326 |
| Jun. 5, 2008 | (EP) | ................................... | 08157683 |
| Jun. 5, 2008 | (EP) | ................................... | 08157684 |
| Oct. 15, 2008 | (EP) | ................... | PCT/EP2008/063879 |

(51) Int. Cl.

| | |
|---|---|
| C08F 255/00 | (2006.01) |
| C08F 255/02 | (2006.01) |
| C08F 255/04 | (2006.01) |
| C08F 265/02 | (2006.01) |
| C08F 267/04 | (2006.01) |
| C08F 291/00 | (2006.01) |
| C08L 51/00 | (2006.01) |
| C08L 51/04 | (2006.01) |

(52) U.S. Cl.
CPC .......... *C08F 255/02* (2013.01); *C08F 255/04* (2013.01); *C08F 265/02* (2013.01); *C08F 267/04* (2013.01); *C08F 291/00* (2013.01); *C08L 51/003* (2013.01); *C08L 51/04* (2013.01)

(56) References Cited

U.S. PATENT DOCUMENTS

| | | | |
|---|---|---|---|
| 4,518,615 | A | 5/1985 | Cherukuri et al. |
| 4,886,857 | A | 12/1989 | Ota et al. |
| 5,208,369 | A * | 5/1993 | Crump et al. ................. 562/106 |
| 5,336,509 | A | 8/1994 | McGrew et al. |
| 5,364,907 | A | 11/1994 | Rolando et al. |
| 5,527,170 | A | 6/1996 | Graves et al. |
| 5,580,590 | A | 12/1996 | Hartman |
| 6,075,093 | A * | 6/2000 | Rodrigues ..................... 525/207 |
| 6,190,706 | B1 | 2/2001 | Bunczek et al. |
| 6,274,060 | B1 * | 8/2001 | Sakashita et al. ........... 252/8.62 |
| 6,280,648 | B1 * | 8/2001 | Konzelman et al. ........ 252/8.61 |
| 6,359,067 | B1 | 3/2002 | Miyawaki et al. |
| 6,441,126 | B1 | 8/2002 | Cook et al. |
| 6,592,850 | B2 | 7/2003 | Gmunder et al. |
| 6,986,907 | B2 | 1/2006 | Phillips et al. |
| 8,211,980 | B2 * | 7/2012 | Cosgrove ................. A23G 4/08 426/4 |
| 2004/0005351 | A1 * | 1/2004 | Kwon et al. ................... 424/450 |
| 2004/0097624 | A1 | 5/2004 | Camus et al. |
| 2005/0054796 | A1 | 3/2005 | Tsai |
| 2005/0084466 | A1 | 4/2005 | Mullay et al. |
| 2006/0057209 | A1 * | 3/2006 | Chapman et al. ............ 424/486 |
| 2008/0233233 | A1 | 9/2008 | Soper et al. |

FOREIGN PATENT DOCUMENTS

| | | |
|---|---|---|
| EP | 0 919 577 A1 | 6/1999 |
| EP | 0 945 473 A1 | 9/1999 |
| EP | 0 945 501 A1 | 9/1999 |
| EP | 1 179 564 A1 | 2/2002 |
| GB | 1025958 | 4/1966 |
| JP | A-2005-272793 | 10/2005 |
| WO | WO 99/31994 A1 | 7/1999 |
| WO | WO 99/31995 A1 | 7/1999 |
| WO | WO 01/00731 A1 | 1/2001 |
| WO | WO 03/087254 A2 | 10/2003 |
| WO | WO 2006/016179 A1 | 2/2006 |
| WO | WO 2006016179 A1 * | 2/2006 |
| WO | WO 2007/093745 | 8/2007 |
| WO | WO 2008/104546 A1 | 9/2008 |

OTHER PUBLICATIONS

AM Atta, SH El-Hamouly, AM AlSabagh, MM Gabr. "Crosslinked Poly(octadecene-alt-maleic anhydride) Copolymers as Crude Oil Sorbers." Journal of Applied Polymer Science, vol. 105, 2007, pp. 2113-2120, Published Online May 3, 2007.*

WW Yu, E Chang, CM Sayes, R Drezek, VL Colvin. "Aqueous dispersion of monodisperse magnetic iron oxide nanocrystals through phase transfer." Nanotechnology, vol. 17, 2006, pp. 4483-4487.*

Eckert et al.; "Napthalene-Tagged Copolymer Micelles Based on Polystyrene-*alt*-maleic anhydride-*graft*-poly(ethylene oxide)" *Macromolecules*; 1996; pp. 550-557; vol. 29; The American Chemical Society.

Liming et al.; Synthesis and Characterization of a New Comblike Polymer Based on Poly (Vinyl Methyl Ether-Alt-Maleic Anhydride) Backbone; *Chinese Journal of Polymer Science*; 1995; pp. 264-272; vol. 13, No. 3.

International Search Report dated Mar. 17, 2009 for corresponding International Application No. PCT/EP2008/066257.

International Preliminary Report on Patentability dated Jun. 2, 2010 for corresponding International Application No. PCT/EP2008/066257.

Visconte et al., "Kinetic Behavior of UV-sensitive Polymers from Modified Natural Rubber," Polymers for Advanced Technologies, vol. 4, pp. 490-495, Jan. 18, 1993.

Lin et al., "Synthesis, Characterization, and Interfacial Behaviors of Poly(oxyethylene)-Grafted SEBS Copolymers," Ind. Eng. Chem. Res., 2000, vol. 39, pp. 65-71.

Lin et al., "Preparation and electrostatic dissipating properties of poly(oxyalkylene)imide grafted polypropylene copolymers," *Polymer*, 2000, vol. 41, pp. 2405-2417.

* cited by examiner

AMPHIPHILIC COPOLYMERIC MATERIAL

The present invention relates to a new amphiphilic polymeric material which is a copolymer comprising a backbone of maleic anhydride and an ethylenically-unsaturated monomer and having a multiplicity of side chains attached to the backbone. The new material has utility in reducing the adhesiveness, or tack, of compositions into which it is incorporated, particularly chewing gum compositions.

The adhesiveness of chewing gum poses a major environmental concern.

After chewing a typical chewing gum formulation, a water insoluble portion, commonly known as the 'cud' remains. The major component of the cud is the original chewing gum base. Although the cud can in principle be easily disposed of, when disposed of irresponsibly it leads to a number of environmental problems, most notably the cost required to remove cuds from public places.

WO2006/016179 discloses new polymeric materials that have reduced tack. These new polymeric materials are shown to reduce the adhesiveness of chewing gum compositions into which they are incorporated. The polymeric materials have a straight or branched chain carbon-carbon polymer backbone and a multiplicity of side chains attached to the backbone. The side chains are derived from an alkylsilyl polyoxyalkylene or a polyoxyalkylene, for instance linked to the backbone via grafted maleic acid/anhydride units.

Copolymers of maleic anhydride together with an ethylenically-unsaturated monomer are well known in the art and are commercially available. For example, poly(ethylene-alt-maleic anhydride) and poly(isobutylene-alt-maleic anhydride) may be purchased from the Sigma-Aldrich catalogue.

Poly(ethylene glycol) has been coupled to the backbone of certain poly(monomer-alt-maleic anhydride) polymers. For example, Eckert et al in Macromolecules (1996), 29, 560-567 describe the partial grafting of poly(styrene-alt-maleic anhydride) with monomethoxy poly(ethylene glycol). The resulting product is crosslinked to form hydrogel microspheres. EP0945501 describes styrene-anhydride copolymers grafted with polyethylene glycol. Similarly, Liming et al in the Chinese Journal of Polymer Science (1995), 13(3), 264-272 report the grafting of poly(ethylene glycol) mono-methyl ether onto the backbone of poly(vinyl methyl ether-alt-maleic anhydride). US2006/0057209 describes anhydride-based copolymers and methods to functionalise these polymers. In one example, poly(styrene-co-maleic anhydride) is reacted with an amino-containing nucleophile, which may be, for instance, an amino functionalised PEG-derivative. The polymers are coated onto a surface in order to modify the surface's hydrophilicity.

Solvent-free methods for making compositions containing anhydride based graft copolymers are known. EP0945473, for instance, describes such a method which involves mixing an ethylenically-unsaturated monomer, an anhydride monomer, and either a monofunctional polyglycol having a hydroxyl or amine terminal group or a polyfunctional polyglycol, and a free radical initiator to form a mixture. The mixture is heated to form a mixture of graft copolymeric materials of the polyglycol and the ethylenically unsaturated monomer including the graft copolymer product, which may be useful as a soil release agent in detergent formulations.

The method of the present invention differs from the disclosure in EP0945473, in that the method in the latter results in a multitude of different products. The method used in this invention avoids this problem by reacting a preformed polymeric backbone with side chain precursors.

There is a desire to provide further new polymeric materials that have reduced tack and that are cheap and efficient to synthesise.

In accordance with a first aspect of the invention there is provided an amphiphilic polymeric material of general formula (I):

$$B-(OR)_x \qquad (I)$$

wherein B is a straight or branched chain polymer backbone which is a copolymer of at least one ethylenically-unsaturated aliphatic hydrocarbon monomer comprising at least three carbon atoms and maleic anhydride and each OR is a hydrophilic side chain attached to the backbone, wherein x denotes the number of side chains and is in the range 1 to 5000.

In accordance with a second aspect of the invention, there is provided a method for producing an amphiphilic polymeric material according to the first aspect of the invention wherein a copolymer starting material of at least one ethylenically unsaturated aliphatic hydrocarbon monomer and maleic anhydride is reacted with side chain precursors of general formula (III), HO—R, to give an amphiphilic polymeric material of general formula (I).

In accordance with a third aspect of the invention, there is provided an amphiphilic polymeric material which has a straight or branched chain polymer backbone and a multiplicity of hydrophilic side chains attached to the backbone, wherein the backbone is a terpolymer of maleic anhydride, ethylene and a further ethylenically unsaturated monomer.

In accordance with a fourth aspect of the invention there is provided a method for producing an amphiphilic polymeric material which comprises a straight or branched chain terpolymer backbone which falls within the scope of the third aspect of the invention.

In accordance with a fifth aspect of the invention there is provided a chewing gum base comprising an amphiphilic polymeric material having a straight or branched chain polymer backbone and a multiplicity of hydrophilic side chains attached to the backbone, wherein the backbone is a copolymer of at least one ethylenically unsaturated monomer and maleic anhydride.

In accordance with a sixth aspect of the invention, there is provided a chewing composition comprising an amphiphilic polymeric material as defined in the fifth aspect of the invention, and one or more sweetening or flavouring agents.

In accordance with a seventh aspect of the invention there is provided an emulsion comprising an amphiphilic polymeric material as defined in the first and third aspects of the invention.

The backbone of the polymeric material according to the invention is flexible and provides more points of attachment for side chains than the polymers in WO2006/016179, which do not have maleic anhydride in the backbone. The new polymeric material may have a variety of different polymer backbones with varying different chemical functionalities, and varying proportions of maleic anhydride. Consequently, it is possible to control the degree of derivatisation with side chains more precisely than in the polymers in WO2006/016179. This allows a greater control over the physical properties of the new polymeric material. The ethylene comonomers in the terpolymer backbone help to increase the chemical stability of the backbone.

By "amphiphilic" we mean that the polymeric material has distinct hydrophilic and hydrophobic portions. "Hydrophilic" typically means a portion that interacts intramolecularly with water and other polar molecules. "Hydrophobic" typically means a portion that interacts preferentially with oils or fats rather than aqueous media. Typically, this distinction is provided by the side chains and the backbone (the side chains being hydrophilic and the backbone hydrophobic). The degree of hydrophobicity of the backbone may be varied by changing the proportion of maleic anhydride in the backbone, or the nature of the comonomer. The side chains and polymer backbone may be ionic or non-ionic.

The "side chain precursors" are the side chain starting materials which become the side chains in the polymeric material. The "copolymer starting material" is the copolymer of maleic anhydride with one or more other monomers, which reacts with the side chain precursors and becomes the backbone in the polymeric material. Similarly, the "terpolymer-starting material" is the terpolymer of maleic anhydride, ethylene and a further ethylenically unsaturated monomer which reacts with side chain precursors to become the backbone in the polymeric material. A terpolymer is a copolymer formed from the polymerisation of three different monomers. Therefore, the term "terpolymer" falls within the scope of the term "copolymer". When using "copolymer" we are referring to the first aspect of the invention and when using the term "terpolymer" we are referring to the third aspect of the invention. However, the first aspect of the invention also encompasses terpolymers. It will be appreciated that in the starting material, there will be many chains of the copolymer/terpolymer. Similarly, in the polymeric material there will be many chains of polymer backbone attached to side chains.

The side chains in the polymeric material are typically attached to the polymer backbone via the units derived from maleic anhydride.

When referring to maleic anhydride in the backbone, it will be noted that we are referring to the units derived from maleic anhydride which are present in the copolymer or terpolymer. In the polymeric material, the "backbone" comprises the units derived from maleic anhydride together with units derived from the other monomers polymerised to make the backbone of the polymeric material. The "side chains" comprise the residual structure of the side chain precursors, after they have reacted with the copolymer or terpolymer starting material.

When the backbone is a copolymer, the polymeric material of general formula (I) comprises 1 to 5000 side chains per backbone, preferably 1 to 1000, more preferably 1 to 500 or 1 to 300, even more preferably 1 to 150, 1 to 100 or 1 to 50. It will be appreciated that the desired number of side chains that are grafted onto the backbone will depend on the molecular weight of the backbone, and the desired properties of the resultant polymeric material. In some embodiments not all maleic anhydride derived units in the backbone are attached to side chains. Each maleic anhydride derived unit may be attached to either one or two side chains.

When the backbone of the polymeric material is a terpolymer, a multiplicity of hydrophilic side chains are attached to the backbone. Typically, 1 to 5000 side chains are attached to each backbone, preferably 1 to 1000, 1 to 500 or 1 to 300, even more preferably 1 to 150, 1 to 100 or 1 to 50.

The side chains of the amphiphilic polymeric material are typically hydrophilic. In the polymeric material of general formula (I), each side chain is represented by formula OR. In the amphiphilic polymeric material which has a terpolymer backbone, the side chains may be linked to the backbone via either a nitrogen or an oxygen atom. Accordingly, the amphiphilic polymeric material may be represented by general formula (IV)

$$B^1—(YR^1)_{x^1} \tag{IV}$$

wherein $B^1$ is the straight or branched chain polymer backbone and each $YR^1$ is a hydrophilic side chain attached to the backbone, wherein Y is oxygen (O) or $NR^5$, wherein $R^5$ is H or $C_{1-4}$ alkyl, and $x^1$ denotes the number of side chains and is in the range 1 to 5000.

Y is preferably an oxygen radical, O.

Without being bound by theory, when the material is incorporated into a composition such as a gum base, hydrophilic side chains substantially decrease the mobility of the gum base in the dry state, making the discarded cud harder when dried out and easier to remove from a surface. Furthermore, hydrophilic side chains may allow saliva to act as an elastomer plasticiser on chewing, making the gum more chewable.

The hydrophilic side chains confer surface active properties on the polymeric material. In a gum base a polymeric material with hydrophilic side chains becomes surface enriched during chewing, giving a hydrophilic coating which does not bind to hydrophobic surfaces, such as asphalts and greasy paving stones. In the presence of water the polymeric material is more easily removable from most common surfaces.

The hydrophilic side chains of the polymeric material are preferably derived from poly(ethylene oxide) (PEO), poly (vinyl alcohol), sodium poly(styrene sulphonate), polyglycidyl, proteins/polypeptides, polysaccharide (e.g. sugars and starches) or poly(acrylic acid); most preferably poly(ethylene oxide). The side chains before attachment to the backbone, may have terminal hydroxyl groups for formation of ester linkages with the maleic anhydride monomers. Poly (ethylene oxide) binds strongly to simple anionic surfactants such as those used in hair shampoo and washing up liquids, to make an electrolyte. In the presence of such anionic surfactants and water, the polymeric material is repelled by many of the common anionic surfaces, including oxide surfaces, cotton clothing and hair. This advantageously allows a gum base comprising the novel polymers with grafts containing a significant percentage of poly(ethylene oxide) to be removed by washing with soapy water.

Typically, sufficient side chain precursors are added such that there is a ratio sufficient to graft two side chains to each maleic anhydride unit. More typically sufficient side chain precursors are reacted to ensure that 1-100% by weight of maleic anhydride units are derivatised with side chains, even more typically 2-50%, in most instances 2-30%. However, in some embodiments of the invention, sufficient side chain precursors are added such that 100% of the maleic anhydride units in the backbone are derivatised. In another embodiment, sufficient side chain precursors may be added such that two or between one and two side chain precursors react with each maleic anhydride unit.

In the polymeric material preferably the side chains OR or $OR^1$ preferably have formula II $$—O—(YO)_a—(ZO)_b—R^3 \tag{II}$$

wherein each of Y and Z is, independently, an alkylene group having from 2 to 4 carbon atoms and $R^3$ is H or an optionally substituted alkyl group having from 1-12 carbon atoms or another polymer chain linked via an acyl group;

and each of a and b is, independently an integer from 1-200, provided that the sum of a+b has a value in the range of 1-250.

The two monomers YO and ZO may be polymerised to form a block copolymer (for instance, by sequential addition of monomer to the system) or alternatively may form a statistical, random or alternating copolymer. Other embodiments may have side chains comprising a third monomer.

The sum a+b is preferably in the range 5-200, more preferably from 20-120.

Typically, in the compound of formula II, the alkylene groups Y and Z are both —CH$_2$—CH$_2$. In one embodiment, in formula II the group R$^3$ is H.

In another embodiment R$^3$ is alternatively —CH$_3$ or another lower alkyl (up to 4 carbon atoms) group.

In the first aspect of this invention, the polymer backbone is a copolymer of at least one ethylenically-unsaturated aliphatic hydrocarbon monomer comprising at least three carbon atoms and maleic anhydride. The copolymer is typically a bipolymer, i.e. comprises two different monomers (maleic anhydride and one ethylenically unsaturated monomer). The hydrocarbon monomer comprises only carbon and hydrogen atoms. Most preferably, the ethylenically-unsaturated monomer is selected from isobutylene, 1,3 butadiene, isoprene and octadecene. Preferably, the ethylenically-unsaturated aliphatic hydrocarbon monomer has 3-5 carbon atoms. Such a polymeric material typically has a greater degree of hydrophilicity, than a polymeric material with hydrocarbon monomer comprising more than 5 carbon atoms in the backbone.

Alternatively, the ethylenically unsaturated monomer comprises 7 or more carbon atoms. For instance, it may have 8-30 carbons atoms. The increased number of carbon atoms in such polymeric materials imparts a greater degree of hydrophobicity to the backbone, which renders the material more suitable for certain applications. Typically, the copolymer comprises 1-75% by weight maleic anhydride, preferably 1-50% or 5-50%, even more preferably 10-50%.

In the third aspect of this invention the polymer backbone is a terpolymer of maleic anhydride, ethylene and a further ethylenically-unsaturated monomer.

The further ethylenically-unsaturated monomer is designated as "further" to distinguish it from ethylene (also an "ethylenically-unsaturated monomer").

Typically, the further ethylenically-unsaturated monomer is an alkyl acrylate, for instance, methyl, ethyl, propyl or butyl acrylate.

In a different embodiment, the further ethylenically-unsaturated monomer is an alkenyl acetate, preferably vinyl acetate. It may alternatively be vinyl ether.

Particularly preferred terpolymer polymer backbones are ethylene-co-butyl acrylate-co-maleic anhydride and ethylene-co-vinylacetate-co-maleic anhydride.

The copolymer of the ethylenically-unsaturated monomer and maleic anhydride may be random, statistical, alternating or block, e.g. A-B or A-B-A block, copolymers. In one embodiment the copolymer is an alternating copolymer. In another embodiment the polymer is a random (or statistical) copolymer. Similarly, the terpolymer C-D-E may be a random polymer or a block copolymer (wherein C is ethylene, D is maleic anhydride and E is the further ethylenically unsaturated monomer).

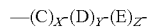

Typically C is present in the range 25-95% by weight. D is typically present in the range 1-50% by weight. E is typically present in the range 5-70% by weight.

The terpolymer starting material described in this invention typically comprises 1-50% by weight of maleic anhydride derived units, more typically 1-30%, even more typically 1-15% by weight maleic anhydride derived units.

Before reaction with side chains precursors, the molecular weight of the copolymer/terpolymer starting material is typically in the range 1000-1,000,000, more typically in the range 2000-100,000. Each side chain precursor typically has a molecular weight of 200-100,000, more typically 450-100,000, preferably 500-50,000, most preferably 1,000-10,000.

In the method to produce the polymeric material according to the first aspect of this invention, the side chain precursors are terminated with hydroxyl groups, HO—R. In a method to produce an amphiphilic polymeric material of general formula (IV), B$^1$—(YR$^1$)$_x^1$, a terpolymer starting material of maleic anhydride, ethylene, and a further ethylenically unsaturated monomer is reacted with side chain precursors of general formula (V), H—YR$^1$, to give an amphiphilic polymeric material of general formula (IV). Thus, in this embodiment, the side chain precursors can be terminated with either hydroxyl or amine groups. Hydroxyl functionalised materials are generally widely accepted as being safe for consumption in moderate amounts by the food industry. Typically, however, side chain precursors terminated with amine groups react more readily with backbone precursors, allowing more side chain precursors to react with each backbone precursor.

Suitable side chain precursors which are polyether amines are available commercially; a range of mono and difunctionalised amine polymers of ethylene oxide (EO) and propylene oxide (PO) are sold under the Jeffamine brand name by Huntsman. Reaction between the amine functionalized polymers with a single maleic anhydride unit, for instance, can generate any of three different structures:

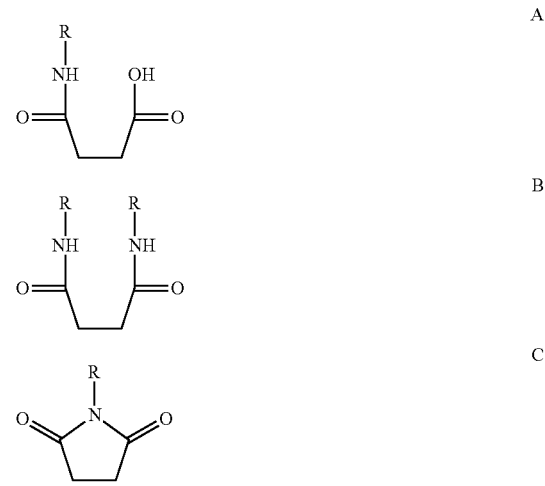

The structure marked C may be formed by an intramolecular reaction of A, accompanied by the elimination of H$_2$O, and is more likely to occur with the assistance of catalysis (e.g by the addition of an acid). Both mono, di, tri and tetra functional amine polymers may used in the invention, some of which are available from Hunstman. Depending on the reaction conditions, the use of hydrophilic difunctional amine side chain precursors can lead to a cross-linked or chain extended amphiphilic polymeric material. Alternatively mono and difunctional side chain precursors may be combined to modify the properties of the resulting polymeric material to that required. The structure and properties of Jeffamine M-1000 and M-2070 are particularly preferred for the side chain precursors.

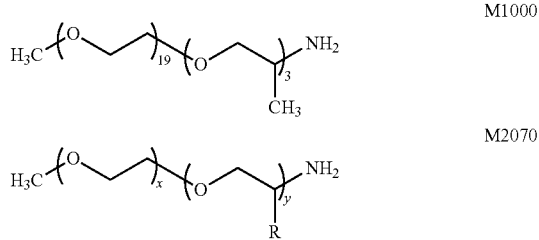

[x=6; y≈35 where R is a mixture of H for (EO), or $CH_3$ for (PO) units]

Jeffamine M-1000 is a monoamine polyether with a EO:PO ratio of 19:3 and a molecular weight of approximately 1000, M-2070 is a monoamine polyether with an EO:PO ratio of 31:10 and a molecular weight of approximately 2000. Due to the relatively high ratios of ethylene oxide units in these polymers they are regarded as hydrophilic materials. Both M-1000 and M-2070 have been found to react efficiently with PIP-g-MA.

The side chain precursors are typically terminated by an alcohol unit at one end and an alkyloxy group at the other. MeO-PEO-OH is an example of a preferred side chain precursor. In the method of formation of the polymeric material such side chains react with the maleic anhydride derived units via alcoholysis of the anhydride to give a carboxylic ester and carboxylic acid.

The reaction of maleic anhydride with an alcohol is an alcoholysis reaction which results in the formation of an ester and a carboxylic acid. The reaction is also known as esterification. The reaction is relatively fast and requires no catalyst, although acid or base catalysts may be used.

The net reaction may be represented as shown below. $P_x$ and $P_y$ represent the remainder of the copolymer/terpolymer and ROH is a representative side chain precursor.

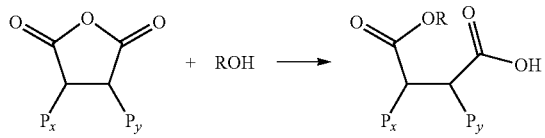

In the method two side chains precursors represented by ROH may react at the same maleic anhydride monomer to give a compound of general formula

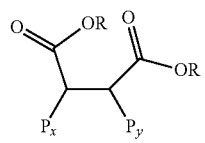

Alternatively, only one side chain precursor reacts per maleic anhydride monomer. This leaves the unit derived from maleic anhydride with a free carboxylic acid group, which may be derivatised at a later stage in the method. This group may also be deprotonated to give an ionic backbone in the polymeric material.

The side chain precursors need not be reacted directly with the units derived from maleic anhydride in the backbone. For instance, a preliminary step may be carried out wherein a linker is reacted with the maleic anhydride derived units. The linker may be, for instance, a short chain hydrocarbon functionalised at either end with suitable reactive groups, such as an alcohol capable of reacting with maleic anhydride, and a halide capable of base catalysed reaction with a PEG hydroxyl group. The side chain precursors are then reacted with the linker in a subsequent reaction step. The reaction may be performed in solution or with one of the reactants, for example with PEG, as a solvent.

In the method according to this invention the side chain precursors may have hydroxyl groups at each of their termini and each terminus reacts with a unit derived from maleic anhydride in different backbones to form a crosslinked polymeric material.

After reaction of the side chain precursors with the copolymer or terpolymer starting material, any unreacted units derived from maleic anhydride in the backbone may be ring-opened. This may be performed by hydrolysis, or using a base. The resulting product may be ionisable. This further reaction step has particular utility when there is a large proportion of maleic anhydride in the backbone, for instance in an alternating copolymer.

Since the methods of this invention are suitable for producing the novel polymeric materials according to the invention, each of the preferred features of the polymeric material discussed above are equally applicable to the polymeric material produced by this method.

Alternative methods for the manufacture of amphiphilic polymeric material include a method whereby side chains precursors are reacted with maleic anhydride monomers, which are then polymerised with ethylenically unsaturated monomers in a subsequent step to form the polymeric material.

The polymer starting material may be purchased from a suitable chemical supplier, such as the Sigma-Aldrich company. For instance, Sigma-Aldrich and Kuraray Co. Ltd both supply poly(isobutylene-alt-maleic anhydride), Kuraray Co. Ltd under the trade name ISOBAM.

With regards to poly(maleic anhydride-alt-1-octadecene), Chevron Philips Chemical Company LLC. manufacture a range of materials in their PA18 Polyanhydride resins range that are suitable.

Poly(ethylene-co-butyl acrylate-co-maleic anhydride) materials can be obtained from Arkema, and are sold under the trade name of Lotader (e.g. 2210, 3210, 4210, and 3410 grades). Copolymers in which the butyl acrylate is replaced by other alkyl acrylates (including methyl acrylate [grades 3430, 4404, and 4503] and ethyl acrylate [grades 6200, 8200, 3300, TX 8030, 7500, 5500, 4700, and 4720) are also available and also sold in the Lotader range.

A number of the Orevac materials (grades 9309, 9314, 9307 Y, 9318, 9304, 9305) are suitable ethylene-vinyl acetate-maleic anhydride terpolymers.

Similarly, suitable side chains precursors, such as mono methoxy poly(ethylene glycol) (MPEG) poly(vinyl alcohol), and poly(acrylic acid) may for instance be purchased from the Sigma-Aldrich company.

The side chain precursors are reacted with the copolymer/terpolymer starting material as detailed in the Examples. For this reaction, the copolymer/terpolymer starting material and side chain precursors are typically dissolved in a suitable solvent. A mixture of DMF and toluene, is, for instance, often suitable. The mixture is then heated, preferably to reflux temperature (~110 to 120° C.) in an inert atmosphere for around 24 hours. Preferably the inert atmosphere is provided by an inert gas such as nitrogen or argon. Water may be removed from the reaction using distillation, for instance using azeotropic distillation. This will not be necessary when the copolymer/terpolymer starting material and side chain precursors are anhydrous. The resulting polymeric material is cooled and then separated from the solvent solution. Precipitation, filtration and drying are typical recovery steps.

Alternatively, the copolymer/terpolymer starting material and side chain precursors may be reacted in the absence of solvent, for instance, the reactions can be carried out by stirring a molten mixture of the copolymer/terpolymer starting material and side chain precursors together at the appropriate temperature (i.e. most preferentially at 100-200° C.). In another embodiment the process can be carried out by adding the copolymer/terpolymer starting material and side chain precursors together, or individually, into a hot extruder; and thereby carrying out the process by reactive extrusion. It is generally advantageous to perform these reactions under an inert gas (e.g. nitrogen) or a vacuum to prevent degradation of the polymers.

The reaction mixture, at the end of the reaction, normally comprises unreacted starting materials which may include free side chain precursor and backbone precursor. There may be some residual catalyst, if this has been used in the reaction. The reaction generally produces no by-products. The amphiphilic polymeric material need not be purified from the reaction mixture, since it can be advantageous to have free side chain precursors in the final composition. The free side chain precursor may interact with the amphiphilic polymeric material and thereby improve its properties.

Most preferably, the amphiphilic polymeric material is incorporated into a chewing gum composition, as defined in the sixth aspect of this invention. In this aspect, the amphiphilic polymeric material has a straight or branched chain polymer backbone and a multiplicity of hydrophilic side chains attached to the backbone. The backbone is a copolymer of at least one ethylenically-unsaturated monomer and maleic anhydride. The term copolymer covers both bipolymers and terpolymers. Preferably the monomer is a hydrocarbon monomer. By the term "ethylenically-unsaturated polymerisable hydrocarbon monomer" we mean a polymerisable hydrocarbon containing at least one carbon-carbon double bond which is capable of undergoing polymerisation to form a straight or branched chain hydrocarbon polymer having a carbon-carbon polymer backbone. According to one preferred embodiment, the ethylenically-unsaturated polymerisable hydrocarbon monomer contains 4 or 5 carbon atoms, and is, for instance, isobutylene (2-methylpropene). The ethylenically unsaturated monomer may alternatively be a conjugated diene hydrocarbon monomer, especially one containing 4 or 5 carbon atoms, such as 1,3-butadiene or isoprene. The backbone may be a terpolymer, as described in the third aspect of this invention. The ethylenically-unsaturated monomer may alternatively be 1-octadecene.

In this aspect of the invention, the ethylenically unsaturated monomer may be aromatic and/or contains atoms other than hydrogen and carbon. Suitable ethylenically unsaturated monomers include styrene and vinyl methyl ether.

The side chains are typically hydrophilic. The side chains precursors, which react with the copolymer/terpolymer starting material, may be terminated with either hydroxyl or amine groups. A particularly preferred amphiphilic polymeric material has general formula $B^2-(Y^2R^2)_x^2$ wherein $B^2$ is a straight or branched chain polymer backbone which is a copolymer of at least one ethylenically unsaturated monomer and maleic anhydride, or a terpolymer as described above, $Y^2$ is O or $NR^5$ and $x^2$ is the number of side chains, and ranges from 1 to 1000. $R^5$ is H or $C_{1-4}$ alkyl, and each $Y^2R^2$ is a hydrophilic side chain.

A typical copolymer starting material comprises 1 to 50% by weight maleic anhydride.

Preferably, the polymeric material is as defined in the first or third aspects of this invention.

Due to their very nature, chewing gum formulations have an adhesive-like quality. Chewing gum compositions typically comprise a water-soluble bulk portion, a water insoluble chewable gum base and flavouring agents. The gum base typically contains a mixture of elastomers, vinyl polymers, elastomer plasticisers (or solvents), emulsifiers, fillers and softeners (plasticisers). The elastomers, waxes, elastomer plasticisers and vinyl polymers are all known to contribute to the gum base's adhesiveness.

The amphiphilic polymeric material may be incorporated into a chewing gum base manufactured according to standard techniques known in the art, which are described further in WO2006/016179. The amphiphilic polymeric material may alternatively be incorporated into the chewing gum composition independently of the gum base. In a preferred embodiment of the invention, the amphiphilic polymeric material is in both the gum base and the chewing gum composition.

The incorporation of polymeric material into the gum base in addition to or in the place of part or all of the wax, elastomeric material and/or elastomeric solvent reduces the adhesion of the gum base and allows greater ease of removal of the cud from surfaces. The gum bases can therefore advantageously be removed by washing in water or in a mild detergent solution. Furthermore, in contrast to the gum bases of the prior art, the hardness of the gum base is altered by the solvation (plasticisation) of the polymeric material rather than solely by an increase in mouth temperature. The components of the gum base may be varied in accordance with this invention to give a variety of gum bases and compositions to suit the wide range of surfaces and environmental conditions in nature.

Of course all the compounds for the gum base must be acceptable for human consumption, e.g. be food or pharmaceutical grade.

Typically, the polymeric material comprises 3-90% by weight of the chewing gum base, preferably, 3-15% by weight. The polymeric material may act as a substitute for part or all of the ingredients in the gum base which contribute to adhesiveness.

The chewing gum base may comprise 0 to 6% by weight wax. Examples of waxes which may be present in the gum base include microcrystalline wax, natural wax, petroleum wax, paraffin wax and mixtures thereof. Waxes normally aid in the solidification of gum bases and improving the shelf-life and texture as well as providing control over the release rate of flavours. Waxes have also been found to soften the base mixture and improve elasticity during chewing. Preferably, the gum base comprises substantially no wax, and these properties are provided by the polymeric material.

The elastomeric material provides desirable elasticity and textural properties as well as bulk. Suitable elastomeric materials include synthetic and natural rubber. More specifically, the elastomeric material is selected from butadiene-styrene copolymers, polyisobutylene and isobutylene-isoprene copolymers. It has been found that if the total amount of elastomeric material is too low, the gum base lacks elasticity, chewing texture and cohesiveness, whereas if the content is too high, the gum base is hard and rubbery. Typical gum bases contain 10-70% by weight elastomeric material. Typically, the polymeric material will form at least 1% by weight, preferably at least 10% by weight, more preferably at least 50% by weight of the elastomeric material in the chewing gum base. In some embodiments, the polymeric material completely replaces the elastomeric material in the chewing gum base.

Elastomer plasticisers aid in softening the elastomeric material and include methyl glycerol or pentaerythritol esters of rosins or modified rosins, such as hydrogenated, dimerized, or polymerized rosins or mixtures thereof. Examples of elastomer plasticisers suitable for use in the chewing gum base of the present invention include the pentaerythritol ester of partially hydrogenated wood rosin, pentaerythritol ester of wood rosin, glycerol ester of partially dimerized rosin, glycerol ester of polymerised rosin, glycerol ester of tall oil rosin, glycerol ester of wood rosin and partially hydrogenated wood rosin and partially hydrogenated methyl ester of rosin; terpene resins including polyterpene and polymers of α-pinene or β-pinene and mixtures thereof. Elastomer plasticisers may be used up to 30% by weight of the gum base. The preferred range of elastomer solvent, however, is 2 to 18% by weight. Preferably it is less than 15% by weight. Alternatively, no elastomer solvent may be used.

The weight ratio of elastomer plus polymeric material to elastomer plasticiser is preferably in the range (1 to 50):1 preferably (5 to 25):1.

The chewing gum base preferably comprises a non-toxic vinyl polymer. Such polymers have affinity for water and include poly(vinyl acetate), ethylene/vinyl acetate and vinyl laurate/vinyl acetate copolymers. Preferably, the non-toxic vinyl polymer is poly(vinyl acetate). Preferably, the non-toxic vinyl polymer is present at 15-45% by weight of the chewing gum base. The non-toxic vinyl polymer should have a molecular weight of at least 2000.

The chewing gum base preferably also comprises a filler. Fillers are used to modify the texture of the gum base and aid in its processing. Examples of typical fillers include calcium carbonate, talc, amorphous silica and tricalcium phosphate. Preferably, the filler is silica. The size of the filler particle has an effect on cohesiveness, density and processing characteristics of the gum base on compounding. Smaller filler particles have been shown to reduce the adhesiveness of the gum base.

Preferably, the chewing gum base comprises a softener. Softeners are used to regulate cohesiveness, to modify the texture and to introduce sharp melting transitions during chewing of a product. Softeners ensure thorough blending of the gum base. Typical examples of softeners are hydrogenated vegetable oils, lanolin, stearic acid, sodium stearate, potassium stearate and glycerine. Softeners are typically used in amounts of about 15% to about 40% by weight of the chewing gum base, and preferably in amounts of from about 20% to about 35% of the chewing gum base.

A preferred chewing gum base comprises an emulsifier. Emulsifiers aid in dispersing the immiscible components of the chewing gum composition into a single stable system. Suitable examples are lecithin, glycerol, glycerol monooleate, lactylic esters of fatty acids, lactylated fatty acid esters of glycerol and propylene glycol, mono-, di-, and tri-stearyl acetates, monoglyceride citrate, stearic acid, stearyl monoglyceridyl citrate, stearyl-2-lactylic acid, triacyetyl glycerin, triethyl citrate and polyethylene glycol. The emulsifier typically comprises from about 2% to about 10%, and preferably about 4% to about 6% of the chewing gum base.

The chewing gum composition comprises a chewing gum base and one or more sweetening agents and flavouring agents. The chewing gum composition may additionally comprise a biologically active ingredient. The amphiphilic polymeric material controls the release of the active ingredient from the chewing gum composition.

The biologically active ingredient is any substance which modifies a chemical or physical process in the human or animal body. Preferably, it is a pharmaceutically active ingredient and is, for instance, selected from anti-platelet aggregation drugs, erectile dysfunction drugs, NSAID's, NO Donors for angina, non-opioid analgesics, antibacterial drugs, antacids, diuretics, anti-emetics, antihistamines, anti-inflammatories, antitussive, anti-diabetic (for instance, insulin), opioids, hormones and combinations thereof. Preferably, the active ingredient is a stimulant such as caffeine or nicotine. Alternatively, the active ingredient is an analgesic. A further example of an active ingredient is insulin.

In one embodiment of the invention, the biologically active ingredient is a non-steroidal anti-inflammatory drug (NSAID), such as diclofenac, ketoprofen, ibuprofen or aspirin. Alternatively the active ingredient is paracetamol (which is generally not classed as an NSAID).

In a different embodiment of the invention, the biologically active ingredient is a vitamin, mineral, or other nutritional supplement.

The biologically active ingredient may be an anti-emetic, for instance Dolasetron. Alternatively the biologically active ingredient is an erectile dysfunction drug, such as sildenafil citrate.

Generally the chewing gum composition comprises 0.01-20% wt active ingredient, more typically 0.1-5 wt %. The chewing gum composition may be in unit dosage form suitable for oral administration. The unit dosage form preferably has a mass in the range 0.5-4.5 g, for instance around 1 g. Generally, the chewing gum composition comprises 1-400 mg biologically active ingredient, more typically 1-10 mg, depending on the active ingredient. When the active ingredient is nicotine, for instance, the chewing gum composition typically comprises 1-5 mg nicotine. When the active ingredient is a non-steroidal anti-inflammatory drug, such as ibuprofen, the composition typically comprises 10-100 mg active ingredient.

Generally, the chewing gum composition will be chewed for up to an hour, although up to 30 minutes is more common. Preferably, after 30 minutes of chewing, at least 40%, more preferably at least 45%, most preferably at least 50% of the active ingredient present in the chewing gum composition has been released into the mouth. Depending on the nature of the active ingredient and its intended use, release may occur over a relatively longer or shorter period. For some active ingredients, for instance, a slow, sustained release is preferred, since this may reduce the active's side effects. This is the case for sildenafil citrate, as described in U.S. Pat. No. 6,592,850. In such cases, it is preferred that no more than 50% of the active is released after 15 minutes of chewing, and that active release still continues between 15 and 30 minutes after the commencement of chewing.

Alternatively, a faster rate of release may be preferable. Smokers using nicotine-replacement therapy, for instance, would prefer a faster delivery of nicotine to satisfy their nicotine craving. In such cases, it is preferred that 25-100% of the active is released after 10 minutes of chewing. More typically 35-65% of the active is released after 10 minutes of chewing. A fast release chewing gum composition that delivers a high total release of nicotine after a reasonable chewing time has the advantage that less gum (i.e. less pieces of gum, or pieces with a lower mass) need to be purchased and chewed by the consumer. Alternatively, and to the advantage of the manufacturer, less of the active needs to be added to the chewing gum composition.

The sweetening agent may be selected from a wide range of materials including water-soluble artificial sweeteners, water-soluble agents and dipeptide based sweeteners, including mixtures thereof. The flavouring agents may be selected from synthetic flavouring liquids and/or oils derived from plants, leaves, flowers, fruits (etc.), and combinations thereof. Suitable sweetening and flavouring agents are described further in U.S. Pat. No. 4,518,615.

The chewing gum composition of the present invention may comprise additional amphiphilic polymeric material (i.e. additional to the polymeric material that may be present in the chewing gum base), in addition to the chewing gum base, sweetening agent and flavouring agent. Preferably, this additional polymeric material, if present, comprises 1-20%, more preferably 3-15% by weight of the chewing gum composition. It may be soluble or insoluble in water.

The method for forming the chewing gum composition typically comprises blending the gum base with biologically active ingredient and sweetening and flavouring agents. Standard methods of production of chewing gum compositions are described in *Formulation and Production of Chewing and Bubble Gum. ISBN:* 0-904725-10-3, which includes manufacture of gums with coatings and with liquid centres.

Typically, chewing gum compositions are made by blending gum base with sweetening and flavouring agents in molten form, followed by cooling of the blend.

Suitable apparatus for forming the chewing gum base and composition include apparatus capable of mixing the components together at an elevated temperature. The mixture may be preheated but most typically the mixer is heated via means of a jacket around the mixing bowl or cavity. In the laboratory, a HAAKE MiniLab Micro Compounder (Thermo Fisher Corporation) may be used to form both the gum base and the chewing gum composition. On an industrial scale appropriate screw (or auger), Z-blade or double sigma blade mixing apparatus are particularly suitable.

In the case of the gum base, the ingredients are typically mixed together by adding them in stages at a temperature in the range 80-120° C., typically around 100° C. After the gum base has formed, the material is extruded out of the Minilab.

The chewing gum composition may require heating to a temperature of around 100° C. (for instance, in the range 80-120° C.) in order to uniformly mix the components. This may present a problem when a biologically active ingredient is present in the chewing gum composition, and this is temperature sensitive, i.e. is unstable at such high temperatures. If the active ingredient is temperature sensitive, it is preferred that when the chewing gum base is mixed with one or more sweetening and/or flavouring agents, and heated, to a temperature in the range 80-120° C. (preferably 100° C.). The mixture is generally cooled to a temperature in the range 40-80° C., preferably 50-70° C. This mixture is then cooled to a temperature at which the active ingredient is stable, and the active ingredient is added to the cooled mixture, optionally together with one or more further sweetening and flavouring agents to form a chewing gum composition. Amphiphilic polymeric material as defined above in the first aspect of the invention is added at either the gum base-forming step, or in step (ii) when the chewing gum composition is formed. Polymeric material may be added during both of these steps.

After the mixing is complete, the chewing gum composition is extruded.

A unit dosage form of the chewing gum composition may be formed by extruding the chewing gum and shaping the extrudate to the desired form. The unit dosage form typically has a mass in the range 0.5-2.5 g, typically around 1 g. The dosage unit may take the form of a cylindrical or spherical body, or a tab.

Typically, the chewing gum composition comprises 5-95% by weight, preferably 10-50% by weight, more preferably 15-45% of the chewing gum base. Additional polymeric material may also be added to form the chewing gum composition, in an amount such that it comprises 1-15%, more preferably 3-15% of the chewing gum composition.

The steps to form the chewing gum composition may be carried out sequentially in the same apparatus, or may be carried out in different locations, in which case there may be intermittent cooling and heating steps.

Although the beneficial properties of the new polymeric material are particularly apparent in relation to chewing gum bases, it will be appreciated that the new polymers will also impart their beneficial properties on other compositions which require reduced adhesiveness, or a modified hydrophilic/hydrophobic balance. Since the new polymers are believed to be non-toxic they may be incorporated into compositions which are used in contact with the human body.

The new polymeric material may have personal care applications, for instance, in body and/or hair cleaning products, cosmetics, skin and sun care. The polymeric material may also be used as an emulsifier in food products. One particularly preferred use of the polymeric material is an emulsifier, dispersant or adjuvant in cosmetic products, or as a stabiliser. Alternatively, the polymeric material may have home care applications, such as in detergents, carpet, fabric, window, bathroom, kitchen and multipurpose cleaners. The polymeric materials may also be useful as surfactants or cleaning agents for personal or home care applications.

The new polymeric material has been shown to affect the behaviour of water with surfaces. This means that the polymeric material may be used to coat fabric, glass and architectural surfaces. The polymeric material may furthermore be used in an antifog coating composition.

Coatings of these graft copolymers may prove useful in protecting a range of surfaces for instance walkways, roads, architectural surfaces such cement, concrete, glass, metal, brick, stone, granite, tiles and other masonry and fabric.

In an alternative embodiment, the new polymeric material is used as a wetting agent, for instance, on the surface of contact lenses, or is used as an agricultural spray adjuvant (a wetting agent for leaves).

The sixth aspect of this invention provides an emulsion comprising the amphiphilic material as described above in relation to the chewing gum composition, wherein the amphiphilic material typically acts as an emulsifier. The emulsion may be an oil-in-water or a water-in-oil emulsion. The emulsion may be used in cosmetic products or alternatively, household products such as paints. The amphiphilic polymeric material may act as a surfactant to stabilise the emulsion.

In this embodiment, it is particularly preferred that during the method to make the polymeric material, any unreacted maleic anhydride in the backbone is ring-opened (for instance, by hydrolysis, or using a base). In the emulsion, typically the polymeric material comprises 0.1 to 10 wt %, preferably around 1 wt % of the oil phase, but may be varied to modify the stability of the emulsion. In this context, by oil we mean a relatively hydrophobic liquid that is immiscible with water. The oil may be, for instance, silicone oil or toluene. The ratios of water and oil typically vary according to the application, and may vary between predominately water, and predominately oil based. The solubility of the polymeric material in water and the oil/s determines the method of formulation and structure of the emulsion. Generally, an emulsion stabilised using an emulsifier soluble in the oil phase will lead to a water-in-oil emulsion, whereas one formed using a water soluble material will lead to an oil in water emulsion. As detailed above, the choice of polymer backbone determines its hydrophilicity and degree of derivatisation with hydrophilic side chains which is possible. Those polymeric materials with more hydrophobic backbones (or less hydrophilic side chains) will tend to stabilise water-in-oil emulsions, whereas the more hydrophilic backbones (or polymeric materials with more side chains) will tend to stabilise oil-in-water emulsions.

The HLB value of the polymeric material may give a good indication of the material's ability to act as an emulsifier. HLB values are described in more detail in Colloid & Surface Chemistry, Duncan J. Shaw, $4^{th}$ edition, ISBN: 0750611820. Generally, if the polymeric material has a HLB value in the range 3 to 6, it will produce a water-in-oil emulsion and if the HLB value is in the range 8 to 15, the polymeric material will produce an oil-in-water emulsion.

The invention further provides use of an amphiphilic polymeric material as described above in relation to the chewing gum composition as a surfactant for cleaning purposes. Preferably, in this embodiment, any unreacted maleic anhydride in the backbone is ring-opened, as detailed above, using a base, for instance, NaOH. Most preferably the amphiphilic polymeric material is a sodium or potassium salt.

The invention will now be illustrated by the following Examples which refer to FIGS. 1 to 3, in which.

Figure 1:
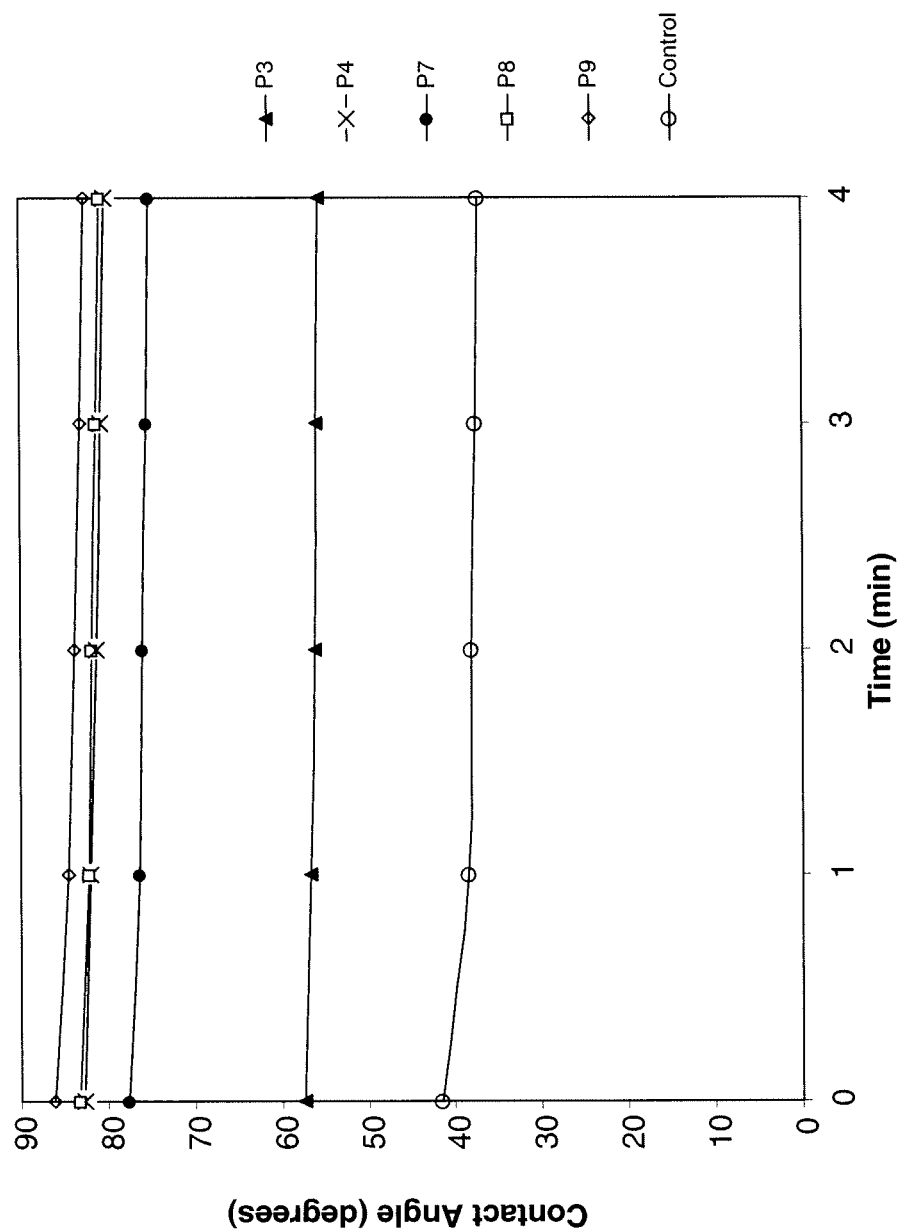
FIG. 1 shows the contact angle measurements for the various graft copolymers.

REFERENCE EXAMPLE 1.0—POLYMER BACKBONES 1.1 Maleic Anhydride Copolymers
Poly(Isobutylene-Alt-Maleic Anhydride):
Two molecular weights ($M_n$: 6000, 60 000 g mol$^{-1}$, as declared by the supplier), both were obtained from the Sigma-Aldrich company.
Poly(Maleic Anhydride-Alt-1-Octadecene):
Molecular weight 30-50 000 g mol$^{-1}$ (as declared by the supplier) obtained from the Sigma-Aldrich company.
1.2 Ethylene-Maleic Anhydride Terpolymers
These are random copolymers of ethylene, maleic anhydride, and another monomer.
Poly(Ethylene-Co-Butyl Acrylate-Co-Maleic Anhydride)
This is a copolymer of ethylene (91 weight percent), N-butyl acrylate (6%), and maleic anhydride (3%). This material was obtained from Sigma-Aldrich (molecular weight undisclosed and propriety information).
Poly(Ethylene-Co-Vinyl Acetate-Co-Maleic Anhydride)
This is a copolymer of ethylene, vinyl acetate and maleic anhydride. The polymer was obtained from Arkema and sold under the Orevac trade name (grade 9304 was used).

REFERENCE EXAMPLE 2.0—SIDE CHAINS PRECURSORS

In all cases the graft was methoxy poly(ethylene glycol) (MPEG), also known as poly(ethylene glycol) methyl ether (PEGME). Material was obtained from two suppliers, the Sigma-Aldrich company, and Clariant (sold as Polyglykol M 2000S). In both cases the polymers were sold as having a molecular weight of 2000, and are believed to be have a very similar chemical structure and properties. Polymers 1, 3-5, and 7 (Table 1) were synthesised using the Aldrich material, the others using the Clariant material.

REFERENCE EXAMPLE 3.0—GRAFT COPOLYMERS

By "graft copolymer", we mean "polymeric material", and these two terms are used interchangeably.
A number of graft copolymers where synthesised by grafting MPEG to the backbones described in Reference Examples 1 and 2.

TABLE 1

Polymers Examined.

| Polymer Sample Number | Backbone | Backbone $M_n$ | Graft | Graft $M_n$ | Backbone MA Loading (weight %) | MA Targeted (mol %)$^c$ |
|---|---|---|---|---|---|---|
| 1 | P(IB-alt-MA) | 6000 | MPEG | 2000 | 64$^a$ | 10 |
| 2 | P(IB-alt-MA) | 6000 | MPEG | 2000 | 64$^a$ | 28 |
| 3 | P(IB-alt-MA) | 60 000 | MPEG | 2000 | 64$^a$ | 10 |
| 4 | P(MA-alt-O) | 30-50 000 | MPEG | 2000 | 28$^a$ | 11 |
| 5 | P(MA-alt-O) | 30-50 000 | MPEG | 2000 | 28$^a$ | 11 |
| 6 | P(MA-alt-O) | 30-50 000 | MPEG | 2000 | 28$^a$ | 100 |
| 7 | P(E-co-BA-co-MA) | Not known | MPEG | 2000 | 3 | 100 |
| 8 | P(E-co-VA-co-MA) | Not known | MPEG | 2000 | 3$^b$ | 50 |
| 9 | P(E-co-VA-co-MA) | Not known | MPEG | 2000 | 3$^b$ | 100 |
| 10 | P(IB-alt-MA) | 6000 | JM-1000$^d$ | 1000 | 64$^a$ | 100 |

$^a$ = Polymers are approximately 50 mol % MA, value for weight % depends on Fw of monomer;
$^b$ = Backbone loading variable between 1.6-3.2%, values calculated using 3.2%
$^c$ = percentage of available MA targeted for reaction;
$^d$ = Jeffamine M-1000 manufactured by Huntsman.

"Backbone MA loading" means the percentage of the molar mass of the backbone that is comprised of MA. "MA targeted" means the percentage of the total number of moles of MA in the backbone that would be expected to react with the MPEG added to the reaction mixture. In the case of polymers where this value is 100, sufficient MPEG was added to graft a PEG chain to every MA unit on the backbone.

As will be apparent from Table 1, often not all of the MA was targeted for reaction. For instance, in the case of Polymer samples 1-5 only a proportion of the maleic anhydride in the alternating copolymer backbone reacted. This leaves a number of maleic anhydride rings present on the backbones which can themselves be exploited by ring opening (see section on emulsification). It may be noted that in some cases not all of the maleic anhydride targeted for reaction with MPEG may have been reacted.

3.1 Synthesis of the Graft Copolymer

Polymer 1:

Poly(isobutylene-alt-maleic anhydride) ($M_n$: 6000 g mol$^{-1}$, 40 g) and poly(ethylene glycol) methyl ether ($M_n$: 2000 g mol$^{-1}$, 50 g) were dissolved in a mixture of DMF (100 mL) and toluene (100 mL) in a reaction flask. The flask was heated at reflux temperature under nitrogen gas for 24 h, any water present being removed from the reaction by means of azeotropic distillation and collection into a Dean-Stark apparatus. The resulting polymer solution was cooled and precipitated into diethyl ether, the polymer recovered using filtration, and dried to remove traces of solvent. The grafting of MPEG onto the backbone was confirmed using infra-red spectroscopy using a Bruker spectrometer by observing changes in the region 1700-1850 cm$^{-1}$ associated with the maleic anhydride units.

The concentration of maleic anhydride (MA) in the backbone is first determined by dissolving a sample in chloroform and measuring the transmittance at 1830 and 1790 cm$^{-1}$. In the case of pure solvent a transmittance of approximately 83% is typically observed at these points. The presence of MA causes a reduction in the transmittance of infra-red radiation at these points, this reduction being directly proportional to the concentration of MA in the polymer. As the concentration of MA goes down as a result of the grafting process the transmittance is expected to increase again. Thus by comparing the transmittance at these two points before and after the reaction it is possible to estimate whether the grafting process has been successful.

Polymer 2:

Polymer 2 was synthesised in the same manner as Polymer 1 using poly(ethylene glycol) methyl ether ($M_n$: 2000 g mol$^{-1}$, 110 g) as the graft. Reaction was allowed to continue for a total of 36 h. The polymer was characterised in a similar manner to polymer 1.

Polymer 3:

Polymer 3 was synthesised in the same manner as Polymer 1 using Poly(isobutylene-alt-maleic anhydride) ($M_n$: 60 000 g mol$^{-1}$, 40 g) as the backbone. The polymer was characterised in a similar manner to polymer 1.

Polymer 4:

Polymer 4 was synthesized in the same manner as Polymer 1 using poly(maleic anhydride-alt-1-octadecene) ($M_n$: 30-50 000 g mol$^{-1}$, 50 g) as the backbone and poly(ethylene glycol) methyl ether ($M_n$: 2000 g mol$^{-1}$, 30 g) as the graft. Toluene (200 mL) was used as the reaction solvent; in this case the polymer solution was precipitated in water. The amphiphilic nature of the resulting graft copolymer led to a poor yield (25% of the theoretical). The polymer was characterised in a similar manner to polymer 1.

Polymer 5:

Polymer 5 was synthesised in the same manner as Polymer 4 except that the polymer solution was not precipitated in water, instead the reaction solvent was removed under vacuum. This material was consequently isolated in a higher yield than P4, and may be suitable for applications where excess PEG in the final product is not a critical issue. The polymer was characterised in a similar manner to polymer 1.

Polymer 6:

Polymer 6 was synthesised in the same manner as Polymer 4 using poly(maleic anhydride-alt-1-octadecene) ($M_n$: 30-50 000 g mol$^{-1}$, 20 g) poly(ethylene glycol) methyl ether ($M_n$: 2000 g mol$^{-1}$, 136 g) as the graft. Toluene (500 mL) was used as the reaction solvent; the polymer solution was precipitated in hexane. Reaction was allowed to continue for a total of 36 h. The polymer was characterised in a similar manner to polymer 1. Excess PEG may be removed from the polymer via dialysis or a similar methodology.

Polymer 7:

Polymer 7 was synthesized in the same manner as Polymer 1 using poly(ethylene-co-butyl acrylate-co-maleic anhydride) (40 g) as the backbone and poly(ethylene glycol) methyl ether ($M_n$: 2000 g mol$^{-1}$, 30 g) as the graft. A mixture of xylene (100 mL) and toluene (100 mL) was used as the reaction solvent; in this case the polymer solution was precipitated in ethanol. The polymer was characterised in a similar manner to polymer 1.

Polymer 8:

Polymer 8 was synthesized in the same manner as Polymer 1 using poly(ethylene-co-vinyl acetate-co-maleic anhydride) (40 g) as the backbone and poly(ethylene glycol) methyl ether ($M_n$: 2000 g mol$^{-1}$, 13 g) as the graft. A mixture of xylene (125 mL) and toluene (125 mL) was used as the reaction solvent; in this case the polymer solution was precipitated in ethanol. The polymer was characterised in a similar manner to polymer 1.

Polymer 9:

Polymer 9 was synthesized in the same manner as Polymer 8 using poly(ethylene glycol) methyl ether ($M_n$: 2000 g mol$^{-1}$, 39 g) as the graft. The polymer was washed thoroughly with more ethanol after filtration to remove PEG from the polymer. The polymer was characterised in a similar manner to polymer 1.

Polymer 10:

Polymer 10 was synthesized in a similar manner to polymer 1 using (isobutylene-alt-maleic anhydride) (Mn: 6000 g mol-1, 20 g) and Jeffamine M-1000 (amine functionalised polyether, Mn: 1000 g mol-1, 129 g) as the graft. Reaction was allowed to continue for a total of 24 h and used toluene (200 mL) as a solvent. The resulting polymer solution was cooled and precipitated into hexane at 0° C. The polymer was characterised in a similar manner to polymer 1.

EXAMPLE 4: APPLICATION TESTS

In all cases with the exception of Test 2 (adhesion tests, 4.2) all of the tests are based around a property which is a result of the amphiphilicity of the graft copolymers.

4.1 Use of the Polymers as Emulsifiers/Surfactants—Test 1

4.1.1 Aim

To measure the ability of the polymers to act as emulsifiers (demonstrate surfactancy) for emulsions of two immiscible liquids. Since the amphiphilic polymeric material acts as a surfactant (surface active agent) it will be present at the interfaces between the two phases. The hydrophilic portions (PEG) and possibly hydrolysed MA units will be in or adjacent to the aqueous phase, whereas the hydrocarbon backbone portions of polymer will associate with the oil (which is not usually completely water miscible).

4.1.2 Methodology

Materials

2M NaOH solution: NaOH (8 g, Aldrich, ACS grade) was dissolved in water (100 mL).

Silicone oil: Dow Corning Corporation 200® fluid, viscosity 5 cSt (25° C.).

Water in Oil emulsion

Applicable where the graft copolymer is soluble in an oil (in this case demonstrated with toluene) but has a lower, or no significant, solubility in water (this dissolution pattern is common to all of the graft copolymers described in the examples to some degree except 6), demonstrated here with polymer 9. Without being bound to theory the colloidal mixture of oil and water formed is believed to have oil as the dispersion medium, and water as the dispersed phase; and may hence be described as a water in oil emulsion. It is generally recognised that the phase in which the emulsifier (surfactant) is the more soluble tends to be the dispersion medium (this generalisation is known as Bancroft's rule). Therefore a water in oil emulsion is typically formed when an emulsion is successfully generated from the addition of water to a solution of a relatively hydrophobic or water insoluble surfactant in an oil, as is the case here. Information on whether oil or water is the dispersion medium in an emulsion can be obtained by various means by those skilled in the art. They are described for instance in Introduction to Colloid & Surface Chemistry (Duncan J. Shaw, $4^{th}$ edition, ISBN: 0750611820). One suitable method described involves adding water and the oil (or oil mixture) to two different aliquots of the emulsion. If the emulsion can be mixed readily with oil (i.e. without the formation of a separate layer of oil) then the dispersion medium is oil, and the emulsion is of a water in oil structure; if the emulsion can be mixed with water then the dispersion medium is water, and the emulsion oil in water.

Polymer 9 (0.44 g) and toluene (44 g, 50 mL) were weighed into a 100 mL beaker, and the polymer dissolved by heating the mixture at 80 t in a water bath. Deionised water (50 mL) was heated in a separate beaker in the same water bath. Both were then removed from the water bath and a paddle stirrer powered by an overhead stirrer placed in the solution. Whilst both were still hot the deionised water was then added gradually to the vigorously stirred toluene solution. Once addition was complete (~2 min) the emulsion was shear stirred using a Silverson laboratory emulsifier for 1 min. Stirring with the paddle stirrer was then restarted, and maintained until the emulsion reached room temperature. A sample of the emulsion was then placed into a sealed screw top jar, and monitored visually at timed intervals (1 h, 24 h, 1 week).

An aliquot of the emulsion was mixed with toluene and one with water. The emulsion mixed readily with the toluene, but not with the water which formed a separate layer. The resultant colloidal mixture was therefore believed to be a water in oil emulsion in which the surfactant is 0.5 weight % of the total emulsion.

Oil in Water Emulsion

Applicable where without further modification the graft copolymer is intrinsically soluble in water (in this case demonstrated with toluene) but has a lower, (as in this case) or no significant, solubility in oil. Without being bound by theory the colloidal mixture of oil and water formed is believed to have water as the dispersion medium, and oil as the dispersed phase; and may hence be described as a oil in water emulsion. This structure is commonly encountered when an emulsion is formed via the addition of an oil to a solution of a relatively hydrophilic surfactant in water.

Polymer 6 (2 g) and deionised water (50 mL) were added into a 100 mL beaker, and the polymer dissolved by stirring the mixture with a magnetic follower. The polymer solution was then shear stirred using a Silverson laboratory emulsifier whilst silicone oil (50 mL) was added gradually to it. Once addition was complete (~2 min), a sample of the emulsion was then placed into a sealed screw top jar, and monitored visually at timed intervals (1 h, 24 h, 1 week).

An aliquot of the emulsion was mixed with silicone oil and one with water. The emulsion mixed readily with the water, but not with the silicone oil which formed a separate layer. The resultant colloidal mixture was therefore believed to be an oil in water emulsion in which the surfactant is approximately 2 weight % of the total emulsion.

Oil in Water Emulsion Using Ring-Opened Graft Copolymers

In these cases the graft copolymers whilst amphiphilic, are not sufficiently water soluble to be dissolved in useful concentrations to serve as emulsifiers. Thus unreacted maleic anhydride present on the backbones is ring-opened by hydrolysis, most preferentially using the assistance of a base. The ring opened acid or salt groups assist in the dissolution of the graft copolymer. Without being bound to theory the colloidal mixture of oil and water formed is believed to have water as the dispersion medium, and oil as the dispersed phase; and may hence be described as an oil in water emulsion.

Polymer 3 (2 g) and 2 M NaOH solution (50 mL) were added into a 100 mL beaker, and the polymer dissolved by stirring the mixture with a magnetic follower. The polymer solution was then shear stirred using a Silverson laboratory emulsifier whilst silicone oil (50 mL) was added gradually to it. Once addition was complete (~2 min), a sample of the emulsion was then placed into a sealed screw top jar, and monitored visually at timed intervals (1 h, 24 h, 1 week).

An aliquot of the emulsion was mixed with silicone oil and one with water. The emulsion mixed readily with the water, but not with the silicone oil which formed a separate layer. The resultant colloidal mixture was therefore believed to be a oil in water emulsion in which the surfactant is approximately 2 weight % of the total emulsion.

4.1.3 Results

Emulsions have been made via the three different methods. A water in oil emulsion was stabilised by polymer 9, and an oil in water emulsion was stabilised by polymer 6. In the case of polymer 3 the graft polymer was dissolved by ring-opening residual maleic anhydride in the polymer backbone using a base. The emulsions appeared to be stable for a period of a week, in the case of the emulsion of polymer 6 a small amount of separation was observed after this period, which was immediately easily redispersed by gently shaking the mixture by hand. The stability of the emulsions is dependent on a number of factors including the concentration of the surfactant (emulsifier), and may thus be altered to a certain degree by altering its concentration. The use of more emulsifier may be expected to increase the length of stability of the emulsions. In some cases the use of another surfactant (for instance an ionic surfactant like sodium dodecyl sulfate, or a non-ionic surfactant like an alcohol ethoxylate) may be used to increase the stability of emulsions containing these surfactants. It will be appreciated that in industrial or consumer use the emulsions may be enhanced by a number of other ingredients, which may include functional or active ingredients specific to the application, stabilizers, preservatives, pigments and colouring agents, fragrances, thickeners, anti-foaming agents, film forming agents, amongst other ingredients. The amphiphilic nature of the graft copolymers leads to their surface activity, and activity as emulsifiers. Since the hydrophilicity of the polymeric material can be varied, they have the potential to be used to stabilise emulsions of various oils and water, which have both an oil in water and water in oil structure.

4.1.4 Conclusions

It is possible to use the graft copolymers as surfactants for emulsions of oil and water. The polymers may be used without modification, or in a ring-opened form. Graft copolymers with a high degree of grafting with PEG typically have a better solubility in water than oil and are thus more likely to be useful as oil in water emulsifiers. Conversely, those with lower degrees of grafting with hydrophile are more likely to find use as surfactants for water in oil emulsions. The solubilities of the polymers in water can be increased by ring opening residual maleic anhydride in these cases, allowing the use of the resultant material as an oil in water emulsifier.

EXAMPLE 4.2.0: ADHESION TESTS—TEST 2

4.2.1 Aim

To measure the ability of films of the graft copolymers to reduce the ability of an adhesive substance (commercial chewing gum) to stick to a substrate, thus creating a non-stick surface.

4.2.2 Methodology

Preparation of Discs

A series of smooth discs of 5 cm diameter and 3 mm thickness were created by cutting rods of nylon, PTFE, brass, and stainless steel to the appropriate size. Solutions of the polymers under test were then prepared. Polymer 1 was dissolved in THF (5 weight % solution); 3 was dissolved in THF (3.3 weight % solution); 6 in THF (2.5 weight % solution); polymers 2, 7, 8 and 9 were dissolved in toluene (5 weight % solutions), and 4 dissolved in ethyl acetate (2.5 weight % solution). The still warm solutions were then carefully applied to the discs with the aid of a small brush, one of each substrate being coated with each solution. The discs were left for at least 30 minutes to dry, prior to being recoated. The total number of coats was adjusted according to the concentration of the solutions, so that for instance a total of four coats were applied in the case of 5 weight percent solutions, eight in the case of 2.5 weight percent solutions. The discs were left overnight in the fume cupboard to fully dry.

Test Conditions

Pieces of chewing gum (Wrigley's Extra brand, peppermint flavour) were chewed for 5 min, and a freshly chewed piece applied to each dry disc. A square piece of PTFE film was then placed on top of the gum, and a weight comprised of a 1 L glass bottle filled with 1 L of water was placed on top of the PTFE square.

The samples were left for three nights after which the weights were removed and the PTFE squares (with gum cuds attached) were then carefully peeled back using the human hand to gauge the force with which the cuds were stuck to the surface of the discs. PTFE was used since it creates a thin, inert layer, which is easy to remove.

4.2.3 Results

Nine polymers were tested on the four substrates, the stickiness of the gum to the discs was assessed on a scale between 1-5, one representing a test with very low adhesion between gum cud and substrate surface, five representing a surface with very high adhesion between the two (Table 2). Control experiments in which no polymer coating was present were also carried out, in order to determine the effect of the coating in reducing adhesion compared with the unprotected substrate.

TABLE 2

Results of the Adhesion Tests of Chewing Gum to films of the Polymers.

| Polymer | Nylon | PTFE | Brass | Stainless Steel |
|---------|-------|------|-------|-----------------|
| 1       | 1     | 3    | 2     | 1               |
| 2       | 1     | 3    | 1     | 1               |
| 3       | 1     | 5    | 1     | 1               |
| 4       | 1     | 1    | 2     | 1               |
| 6       | 1     | 1    | 3     | 1               |
| 7       | 3     | 5    | 2     | 1               |
| 8       | 1     | 2    | 1     | 1               |
| 9       | 1     | 1    | 1     | 3               |
| Control | 3     | 5    | 4     | 5               |

It is clear from the control that generally high adhesion is observed between the four substrates and the gum cuds. The graft copolymers are all suitable for reducing the adhesiveness of the surfaces. In all cases, with the sole exception of polymer 7, the graft copolymers created a non-stick surface on nylon; with the exception of polymers 3 and 7 they created a non-stick surface or surface with reduced stickiness on the PTFE discs. All of the graft copolymers created a non-stick or surface with reduced stickiness on both of the metal surfaces.

4.2.4 Conclusion

The graft copolymers are suitable for reducing the adhesion of surfaces. Universally they reduced the adhesiveness of metal surfaces, and in almost all cases reduced adhesiveness of gum to polymer substrates.

EXAMPLE 4.3.0: CONTACT ANGLE MEASUREMENTS—TEST 3

4.3.1 Aim

To measure the ability of the graft copolymers to mediate the properties of the surface by using the varying hydrophilicity of the materials to make surfaces either water repellent or to encourage wetting of the surface.

4.3.2 Methodology

Smooth glass discs of 5 cm diameter and 3 mm thickness were prepared by cutting glass rods to the appropriate size. These were coated using solutions prepared in a similar manner to Test 2 (4.2.2). The concentrations of all the solutions were 2.5 weight percent, polymers 1-3, and 6 were dissolved in THF; 4 was dissolved in ethyl acetate, and 7-9 dissolved in toluene.

In all cases the still warm solutions were carefully applied to the glass discs with the aid of a small brush. The discs were left for at least 30 minutes to dry, prior to being recoated. The total number of coats was adjusted according to the concentration of the solutions, so that for instance a total of four coats were applied in the case of 5 weight percent solutions, eight in the case of 2.5 weight percent solutions. The discs were left overnight in the fume cupboard to fully dry.

Following this a drop of water was placed on each disc and the contact angle between the water and substrate measured using a Kruss prop Shape Analysis contact angle goniometer (Model no. DSA 10-Mk2).

4.3.3 Results

The contact angle of a droplet of water was measured on films of the polymers and an uncoated glass control every 30 s for 10 min. In some cases, the water droplet's contact angle decreased so rapidly that it was not possible to measure its value over the full period of ten minutes. In these cases, an attempt was made to measure the initial contact angles.

TABLE 3

Initial and Final Contact Angles for the Various Graft Copolymers

| Polymer | Contact Angle t = 0 min | t = 4 min |
|---|---|---|
| P3 | 57.4 | 55.5 |
| P4 | 82.8 | 80.2 |
| P7 | 77.6 | 75 |
| P8 | 83.3 | 80.7 |
| P9 | 86.1 | 82.6 |
| Control | 41.6 | 34.6 |

The contact angle data is probably most easily compared and visualised in FIG. 1.

Water was observed to make a contact angle with the glass of approximately 42° after 0 min, and 35° after 4 min. FIG. 1 depicts the contact angle of water with discs coated with a number of different polymers. Whilst some wetting of the surfaces occurs on the discs, it will be seen that the graft copolymers increase the contact angle of water with the discs indicating that they provide some degree of water repellency to the surface. Polymers 7, 8 and 9 offer the highest degrees of water repellency, probably due to their high hydrophobicity as the materials have a fairly low loading of PEG. In general, materials with a lower hydrophobicity had a lower contact angle. Whilst samples P3 and P4 had a similar loading of PEG, those in P4 had long chain alkyl octadecene groups which will affect the overall hydrophilic/lipohiphilic balance (HLB) of the graft copolymers, and thus explaining the lower contact angle observed on films of P3. Thus whether the amphiphilic copolymers are more hydrophilic or hydrophobic and the subsequent behaviour of the graft copolymers can be altered by changing the backbone and the loading of PEG to that required. A contact angle of 0° was recorded after 2 min on a disc coated with P6 (not show in FIG. 1). This is (without being bound to theory) presumably because the water soluble polymer had been dissolved at this stage, or had absorbed the water. It is of note that the backbone of P4 and P6 is identical, differing only in the loading of PEG (that in P6 being five times higher). This suggests that the hydrophilicity of the graft copolymers can be adjusted to render them as either wetting or water repellent agents.

4.3.4 Conclusions

The tunable amphiphilic nature of the graft copolymers means the interaction of water with surfaces coated with them, can be altered by changing the backbone and degree of amphiphile grafted to the backbone.

EXAMPLE 4.4.0: USE OF THE AMPHIPHILIC GRAFT COPOLYMERS TO MEDIATE THE RELEASE OF A CHEMICAL ENTITY FROM CHEWING GUM

4.4.1 Aims

To demonstrate that the use of the graft copolymers in chewing gum in mediating the release of a chemical entity (in this case the commercial flavour cinnamaldehyde).

4.4.2 Methodology

Chemicals

Calcium carbonate ($CaCO_3$), ester gum, hydrogenated vegetable oil (HVO, hydrogenated soy oil), polyisobutylene (PIB, of molecular weight 51,000), poly(vinyl acetate) (PVAc, of molecular weight 26,000), glyceromonostearate (GMS), microcrystalline wax (microwax of m.p. 82-90° C.), sorbitol liquid, and sorbitol solid, were all food grade materials obtained from the Gum Base Company. Cinnamaldehyde (98+%) was obtained from Fisher-Scientific UK.

Manufacture of Chewing Gum

The chewing gum base had the composition as shown in the table below:

TABLE 4

Recipe for the Manufacture of the Gum Bases: X is one of the new graft copolymers, or microcrystalline wax in the case of the S3 control, HVO = hydrogenated vegetable oil, PVAc = poly(vinyl acetate).

| Stage | Component | % Composition | Mass/g |
|---|---|---|---|
| 1 | PIB | 13 | 1.04 |
|  | PVAc | 6 | 0.48 |
|  | $CaCO_3$ | 6 | 0.48 |
|  | Ester Gum | 3.6 | 0.288 |
| 2 | Ester Gum | 5.4 | 0.432 |
|  | $CaCO_3$ | 9 | 0.72 |
| 3 | PVAc | 9 | 0.72 |
|  | Ester Gum | 9 | 0.72 |
|  | $CaCO_3$ | 15 | 1.2 |
| 4 | HVO | 12 | 0.96 |
|  | GMS | 6 | 0.48 |
|  | X | 6 | 0.48 |
|  | Total | 100 | 8 |

The gum base materials were mixed on a Haake Minilab micro compounder manufactured by the Thermo Electron Corporation, which is a small scale laboratory mixer/extruder. The ingredients were mixed together in four steps, the gum only being extruded after the final step. The gum base was mixed at 100° C.

The chewing gum was mixed according to the following table.

TABLE 5

Ingredients for the Chewing Gum: X is one of the new graft copolymers, or microcrystalline wax in the case of the S3 control.

| Stage | Time | Component | Amount |
|---|---|---|---|
| 1 | 15 min | 37.5% Gum Base Containing X | 3 g |
|  |  | 10% Sorbitol Liquid | 0.8 g |
|  |  | 17% Sorbitol Powder | 1.36 g |
| 2 | 15 min | 25.5% Sorbitol Powder | 2.04 g |
|  |  | 6% X | 0.48 g |
|  |  | 3% Sorbitol Liquid | 0.24 g |
|  |  | 1% Cinnamaldehyde Flavour | 0.08 mL |
|  | 30 min | TOTAL | 8 g |

The gum was mixed using the same equipment as the base and extruded after the final step. The gum was mixed at 60° C. In stage 1 the sorbitol liquid and powder were premixed prior to adding them to the gum.

EXPERIMENTAL METHOD

Each pre-shaped piece of gum was weighed before chewing, and the weight recorded to allow estimation of the total quantity of drug in each piece.

A 'ERWEKA DRT-1' chewing apparatus from AB FIA was used, which operates by alternately compressing and twisting the gum in between two mesh grids. A water jacket, with the water temperature set to 37° C. was used to regulate the temperature in the mastication cell to that expected when chewed in vivo, and the chew rate was set to 40 'chews' per minute. The jaw gap was set to 1.6 mm.

40 mL artificial saliva (composed of an aqueous solution of various salts, at approx pH 6—see below, Table 6) was added to the mastication cell, then a plastic mesh placed at its bottom. A piece of gum of known weight was placed on the centre of the mesh, and a second niece of mesh out on too.

TABLE 6

Artificial Saliva Formulation

| Components | Quantity (mmol/L) |
|---|---|
| $KH_2PO_4$ | 2.5 |
| $Na_2HPO_4$ | 2.4 |
| $KHCO_3$ | 15 |
| NaCl | 10 |
| $MgCl_2$ | 1.5 |
| $CaCl_2$ | 1.5 |
| Citric acid | 0.15 |

PH adjusted to 6.7 with HCl

Procedure for Analysing the Release Profiles of Active Ingredients from Gum

The parameters in Table 7 were always used in chewing unless otherwise noted.

TABLE 7

Chewing Parameters

| Parameter | Value |
|---|---|
| Temperature | 37° C. |
| Gaps between jaws | 1.6 mm |
| Twisting angle | 20° |
| Chew Frequency | 40 strokes/min |

At the start of each run, the cell containing the artificial saliva and gum was left for 5 minutes so that the system could equilibrate to 37° C. The gum was then masticated. A sample volume of 0.5 mL was then withdrawn from the test cell periodically during a release run (5, 10, 15, 20, 25, 30, 40, 50 and 60 minutes).

All the samples were then analysed by HPLC using a typical Perkin Elmer HPLC Series 200 system, equipped with an autosampler, pump, and diode array detector. Data handling and instrument control was provided via Totalchrom v 6.2 software.

The gums (approximately 1 g pieces of known weight) were placed between two plastic meshes and chewed mechanically in artificial saliva. They were all analysed using HPLC apparatus. Details of this equipment are as follows:

A typical Perkin Elmer HPLC system—data handling and instrument control via Totalchrom v 6.2. System based on a Series 200 system, equipped with an autosampler, pump, and diode array detector.

In this case the HPLC analysed free cinnamaldehyde in solution that had been released by chewing. The set of conditions for cinnamaldehyde are as follows:

Column: Varian Polaris 5u C18-A 250×4.6 m
Mobile Phase: Acetonitrile/0.05% orthophosphoric acid (60/40)
Flow: 1 mL/min
Detection: UV 25 0 nm
Inj vol: 5 uL Samples in saliva were injected neat after filtration through a 10 mm PTFE acrodisc syringe filter.

The samples were compared against standards (prepared in artificial saliva) covering the range 0.02-1.00 mg/mL. The retention time of cinnamaldehyde was determined to be 4.9 min on this equipment, thus the peak at this retention time was used to detect the released cinnamaldehyde. The samples were chewed two or three times, and in all cases two consistent release curves were generated. All of the samples were run in duplicate on the HPLC apparatus, indicating the results were highly reproducible.

4.4.3 Results

Figure 2:
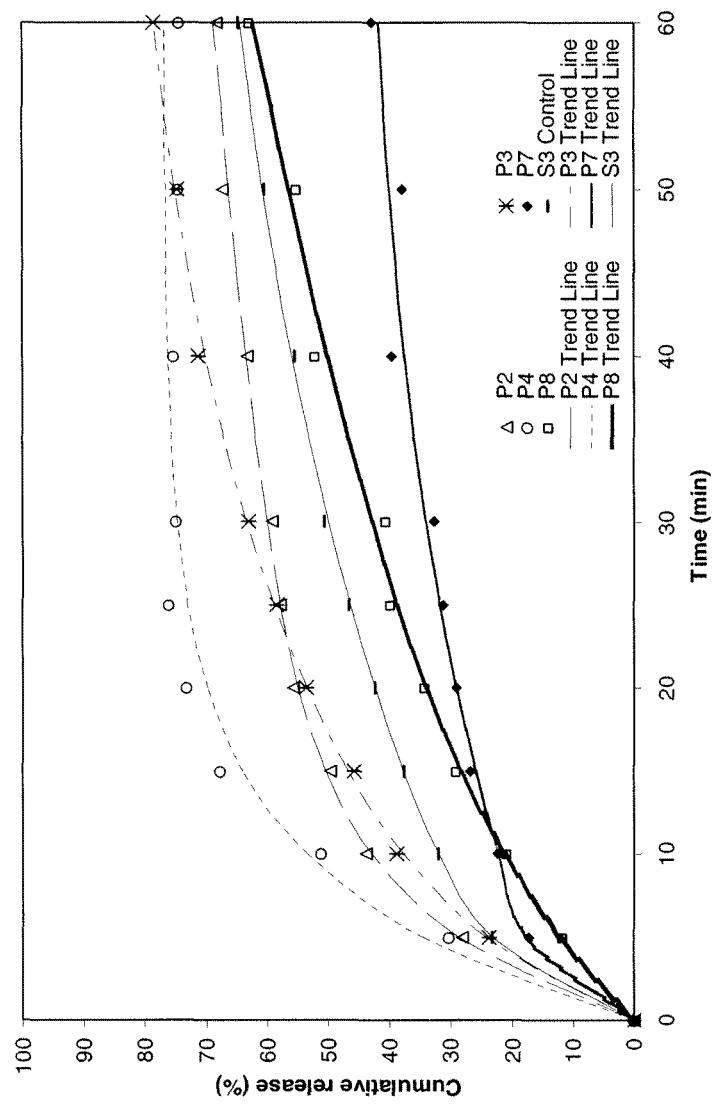
FIG. 2 shows cinnamaldehyde release from chewing gums.

Gums have been made with polymers 1-4 and 6-9, and chewed in artificial saliva. The released cinnamaldehyde is analyzed by HPLC. A control (S3) in which the graft copolymers were replaced with microwax was also made, and analyzed in the same manner (FIG. 2).

The control (S3) is observed to give a fairly steady release of cinnamaldehyde culminating in approximately 60% release after 60 min. Whilst two (P8 and P9) graft copolymer containing gums have release profiles similar to the microwax material, most have either faster and higher maximum, or slower and lower maximum release profiles of the cinnamaldehyde. For instance, polymer 8 only releases 40% of the cinnamaldehyde in the gum after 60 min; compared with 50% in the case of the control. By contrast, cinnamaldehyde release from the gum made using P4 appears to have reached a plateau of approximately 70% cinnamaldehyde release before 30 min. The release rate from the gum containing P3 was slower, but the maximum release was comparable or slightly higher.

4.4 Conclusions

By altering the backbone and the degree of grafting (therefore hydrophilicity) of the amphiphile it is possible to alter the release profile of chemical species from chewing gum, in this case demonstrated with cinnamaldehyde. The release rate seems to be determined by a number of factors including chemical identity of the backbone, and degree of grafting, resulting in changes in the interactions with saliva and other components of the gum. Therefore graft copolymer systems with a range of different release rates potentially available for formulation into chewing gum are disclosed.

4.5.0 Use of the Amphiphilic Graft Copolymers to Mediate the Release of an Active Ingredient 4.5.1 Aims To demonstrate the use of the amphipihilic graft copolymers to deliver and release active ingredients, demonstrated by looking at the release of ibuprofen from solid mixtures of the polymers and ibuprofen, i.e. where the ibuprofen has been encapsulated. By encapsulated, we mean that the active ingredient is physically coated by, or encased, within the graft copolymer.

4.5.2 Methodology

Materials

Ibuprofen (40 grade) was obtained from Albemarle.

Creation of Solid Mixes of Polymer and Ibuprofen

The powdered graft copolymer and ibuprofen were weighed out into a beaker to ensure that the ibuprofen comprised 1 weight percent. The two were premixed with a spatula to create a roughly homogenous mixture, and then mixed and extruded using the Haake Minilab micro compounder at 60° C. In the case of Polymer 2 3.96 g of polymer and ibuprofen (0.04 g) were used; in the case of Polymer 3 2.97 g of polymer and ibuprofen (0.03 g) were used.

Testing Method

The encapsulated ibuprofen samples (approximately 1 g material of known weight) were placed between two plastic meshes and chewed mechanically in artificial saliva. Details of the mastication of the encapsulated ibuprofen is identical to that used with the cinnamaldehyde chewing gum (4.4.2), samples being taken after 5 min, 10 min, 15 min, 20 min, 25 min, 30 min, 40 min, 50 min, and 60 min. Following this they were prepared for HPLC analysis by filtering them through a 10 mm PTFE acrodisc syringe filter. The samples were analyzed using the HPLC apparatus described previously (4.4.2), using the following experimental details:

Ibuprofen HPLC details: (Column: Hypersil C18 BDS, 150×4.6 mm; Mobile phase: Acetonitrile/0.05% aqueous orthophosphoric acid in a 60/40 ratio, 1 mL/min; UV detector, wavelength—220 nm).

The encapsulated ibuprofen samples were chewed two or three times, and in all cases two consistent release curves were generated. All of the samples were run in duplicate on the HPLC apparatus, indicating the results were highly reproducible.

4.5.3 Results

Figure 3:
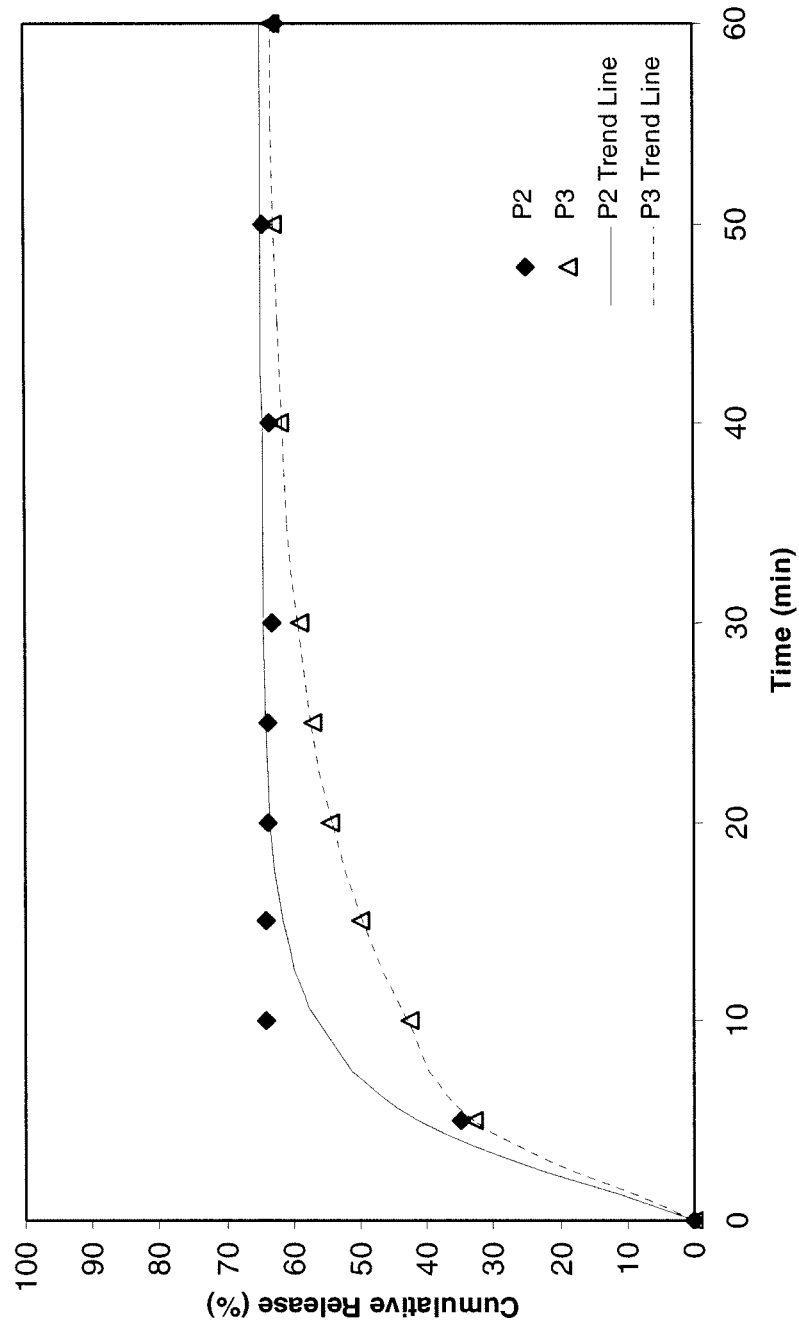
FIG. 3 shows the release of Ibuprofen from samples.

Two different polymers were used to encapsulate the ibuprofen, both were chewed and the release profile monitored by HPLC (FIG. 3).

Both of the polymer/ibuprofen mixtures released ibuprofen into solution during chewing, and released similar total amounts of ibuprofen into the saliva—around 60% of the maximum total, a point at which the release seems to plateau in the two examples tested. Interestingly the release of ibuprofen is much more rapid in the case of polymer 2 than polymer 3. Whereas both polymers have chemically similar backbones, the amount of MPEG grafted to the backbone is much higher in the case of 2. A possible explanation therefore is that increasing the hydrophilicity of the polymers aids disintegration of the encapsulated samples, resulting in faster release during chewing/grinding (the polymers are hard solids).

4.5.4 Conclusions

Ibuprofen was encapsulated in two samples of the graft copolymers, and released by masticating the samples in artificial saliva. Graft copolymer 2 releases ibuprofen more rapidly than graft copolymer 3; the former also contains more PEG and is more hydrophilic. It seems that by adjusting the hydrophilicity of the amphiphilic graft copolymers it is possible to alter the release rate of the ibuprofen.

The invention claimed is:

1. An amphiphilic polymeric material of general formula (I):

$$B-(OR)_x \quad (I)$$

wherein:
B consists of a copolymer where a straight or branched chain polymer backbone thereof is at least one ethyleneically-unsaturated aliphatic hydrocarbon monomer of 3-5 carbon atoms and maleic anhydride, wherein the copolymer is 5 to 75 wt % maleic anhydride;
each OR is a hydrophilic side chain attached to the backbone;
X denotes the number of side chains and is in the range of 1 to 5000; and
R is general formula (II)

$$-(YO)_a-(ZO)_b-R^3 \quad (II)$$

where:
each of Y and Z is, independently, an alkylene group having from 2 to 4 carbon atoms;
$R^3$ is H or a $C_{1-12}$ alkyl group; and
each of a and b is, independently, an integer from 1 to 120 provided that the sum of a+b has a value in the range of 20 to 120.

2. An amphiphilic polymeric material according to claim 1, wherein the ethylenically unsaturated hydrocarbon monomer is selected from the group consisting of isobutylene, 1,3 butadiene and isoprene.

3. An amphiphilic polymeric material according to claim 1, wherein the side chains OR are attached to maleic anhydride in the backbone.

4. An amphiphilic polymeric material according to claim 1, wherein x is in the range of 1 to 300.

5. An amphiphilic polymeric material according to claim 1, wherein each side chain has a molecular weight in the range of 800-10,000.

6. An amphiphilic polymeric material according to claim 1, wherein the backbone has a molecular weight in the range of 1,000-10,000.

7. An amphiphilic polymeric material according to claim 1, wherein Y and Z are both $-CH_2CH_2-$.

8. An amphiphilic polymeric material according to claim 1, wherein $R^3$ is H or $CH_3$.

9. An amphiphilic polymeric material according to claim 1, wherein the copolymer of the backbone comprises 5-50 wt % maleic anhydride.

10. An amphiphilic polymeric material according to claim 1, wherein $R^3$ is H.

11. An amphiphilic polymeric material according to claim 1, wherein $R^3$ is a $C_{1-4}$ alkyl group.

12. An amphiphilic polymeric material according to claim 1, wherein $R^3$ is $CH_3$.

13. A composition comprising:
(i) an amphiphilic polymeric material according to claim 1;
(ii) a backbone precursor which is a copolymer consisting of at least one ethylenically-unsaturated aliphatic hydrocarbon monomer of 3-5 carbon atoms and maleic anhydride, wherein the copolymer comprises 5 to 75 wt % of maleic anhydride; and
(iii) side chain precursors of general formula (III), HO—R, wherein R is general formula (II):

$$-(YO)_a-(ZO)_b-R^3 \quad (II)$$

where each of Y and Z is, independently, an alkylene group having from 2 to 4 carbon atoms;
$R^3$ is H or a $C_{1-12}$ alkyl group; and
each of a and b is, independently, an integer from 1 to 120, provided that the sum of a+b has a value in the range of 20 to 120.

14. A chewing gum base comprising the amphiphilic polymeric material as defined in claim 1.

15. A chewing gum composition comprising the chewing gum base as defined in claim 14.

16. An emulsion comprising the amphiphilic polymeric material according to claim 1, wherein said amphiphilic polymeric material is a surfactant.

17. An emulsion according to claim 16, which is a water-in-oil or oil-in-water emulsion.

18. A method of cleaning a surface, the method comprising: applying the amphiphilic polymeric material as defined in claim 1 to a surface, wherein said amphiphilic polymeric material is a surfactant and cleans said surface.

* * * * *